E. R. CHARLES.
Bit-Stock.
No. 162,271.                          Patented April 20, 1875.
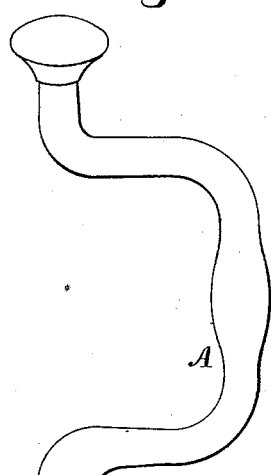
Fig. 1.
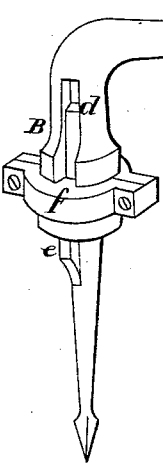
Fig. 2.
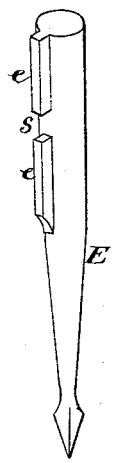
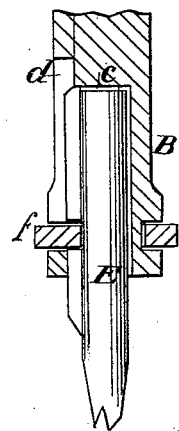
Fig. 3.
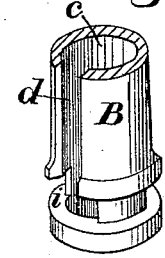
Fig. 4.
Fig. 5.
Witnesses
Geo. H. Strong.
Jn. L. Boone
Inventor
Elbert R. Charles
by Dewey & Co
Attys

UNITED STATES PATENT OFFICE.

ELBERT R. CHARLES, OF PETALUMA, CALIFORNIA.

IMPROVEMENT IN BIT-STOCKS.

Specification forming part of Letters Patent No. 162,271, dated April 20, 1875; application filed February 18, 1875.

*To all whom it may concern:*

Be it known that I, ELBERT R. CHARLES, of Petaluma, Sonoma county, State of California, have invented an Improved Bit-Stock; and I do hereby declare the following description and accompanying drawings are sufficient to enable any person skilled in the art or science to which it most nearly appertains to make and use my said invention or improvement without further invention or experiment.

My invention relates to tool-holders and bit-stocks, and consists in a novel arrangement for securing tools or bits in handles, so that they can be readily removed or substituted, one for another, when desired, and by which they will be firmly and securely held when fastened to the stock or handle.

Referring to the accompanying drawing, in which Figure 1 is a view of the stock and bit united, Fig. 2 is a view of the bit alone. Figs. 3, 4, and 5 are detailed views.

A is a brace having the bit stock or holder B. The hole $c$ in the end of this stock, in which the shank of the tool or bit is inserted, is made round, and along one side of the hole I make a groove, $d$, as shown. The shank of the tool E is made round, to fit the hole $c$, and has a rib, $e$, formed on one side, which fits in the groove $d$. A short distance from the end of the bit-stock I make a groove entirely around it, and in this groove I fit a ring, $f$, which can be turned by the fingers. In the present instance, I have represented the ring with projections at each end, to serve as levers to turn it by; but they are not necessary, as a ring with a milled edge will answer every purpose. In the bottom of the groove in which the ring fits, I make a slot, $i$, on one side of the groove $d;$ and on the inside of the ring $f$ I make a projection, $o$, so that when the ring is turned in one direction the projection $o$ will be moved across the groove $d$. The rib $e$ on the shank of the tool has a recess, $s$, cut in it at the proper point, to allow the projection $o$ on the ring to enter it when the tool has been inserted in the stock, and the ring has been turned so as to bring the projection across the groove $d$, thus fixing the tool firmly in the handle or stock B.

This arrangement is quite simple and extremely strong, while it is easily operated to place and remove the tools.

Having thus described my invention, what I claim, and desire to secure by Letters Patent, is—

The bit-stock or tool-holder B, having the hole $c$ with its groove $d$, and annular groove with its ring $f$, said ring having a projection, $o$, moving in the transverse slot $i$ in combination with a tool, E, having the rib $e$ with its transverse recess $s$, all combined and arranged substantially as and for the purpose described.

In witness whereof I herewith set my hand and seal.

ELBERT R. CHARLES. [L.S.]

Witnesses:
 D. W. DRUMMOND,
 H. O. PROWLETT.